United States Patent
Saffman et al.

(10) Patent No.: US 7,518,784 B2
(45) Date of Patent: Apr. 14, 2009

(54) APPARATUS AND METHOD OF PRODUCING QUANTUM-ENTANGLED, UP-CONVERTED LIGHT BEAMS

(75) Inventors: Mark E. Saffman, Madison, WI (US); Oo-Kaw Lim, Evanston, IL (US)

(73) Assignee: Wisconsin Alumni Research Foundation, Madison, WI (US)

( * ) Notice: Subject to any disclaimer, the term of this patent is extended or adjusted under 35 U.S.C. 154(b) by 0 days.

(21) Appl. No.: 11/750,432

(22) Filed: May 18, 2007

(65) Prior Publication Data

US 2008/0285115 A1    Nov. 20, 2008

(51) Int. Cl.
*G02F 1/35* (2006.01)
*G02F 2/02* (2006.01)

(52) U.S. Cl. .................. 359/326; 359/328; 372/22; 372/105

(58) Field of Classification Search ......... 359/326–332; 372/21, 22, 98, 105; 385/122
See application file for complete search history.

(56) References Cited

U.S. PATENT DOCUMENTS 7,339,717 B2 * 3/2008 Peer et al. ............... 359/326
2007/0291811 A1 * 12/2007 Conti ....................... 372/98

OTHER PUBLICATIONS

Edamatsu, Keiichi et al., "Generation of ultraviolet entangled photons in a semiconductor," *Nature*, Sep. 9, 2004, pp. 167-170, vol. 431, Nature Publishing Group.

* cited by examiner

*Primary Examiner*—Sung H Pak
*Assistant Examiner*—Daniel Petkovsek
(74) *Attorney, Agent, or Firm*—Boyle Fredrickson, SC

(57) ABSTRACT

A single cavity may be used to produce up-converted, quantum-entangled beams relying on the common field of the pumping energy stimulating to up-converting material to produce the quantum entanglement.

18 Claims, 2 Drawing Sheets

APPARATUS AND METHOD OF PRODUCING QUANTUM-ENTANGLED, UP-CONVERTED LIGHT BEAMS

STATEMENT REGARDING FEDERALLY SPONSORED RESEARCH OR DEVELOPMENT

This invention was made with United States government support awarded by the following agency: NSF 0533472. The United States has certain rights in this invention.

BACKGROUND OF THE INVENTION

Quantum-entanglement is a phenomenon in which the quantum states of two objects (e.g. photons or electrons) become correlated and remain correlated even when the objects are separated from each other. Subsequent measurements of a previously indeterminate quantum state of one object will be correlated to a subsequent measurement of the second object.

Light beams with quantum-entanglement have value as a tool for studying quantum fields, making precise measurements, writing sub wavelength spatial structures (for example in photolithography) and for quantum information and communication protocols (including quantum-encryption). See generally: P. D. Drummond and Z. Ficek, Quantum Squeezing (Springer, Berlin) 2004); E. S. Polzik, J. Carri, and H. J. Kimble, Phys. Rev. Lett. 68, 3020 (1992); S. Schiller, R. Bruckmeier, M. Schalke, K. Schneider, and J. Mlynek, Europhys. Lett. 36, 361 (1996); P. H. S. Ribeiro, C. Schwab, A. Maître, and C. Fabre, Opt. Lett. 20, 1893 (1997); N. Treps, N. Grosse, W. P. Bowen, C. Fabre, H.-A. Bachor, and P. K. Lam, Science 301, 940 (2003); A. N. Boto, P. Kok, D. S. Abrams, S. L. Braunstein, C. P. Williams, and J. P. Dowling, Phys. Rev. Lett. 85, 2733 (2000); S. L. Braunstein and P. van Loock, Rev. Mod. Phys. 77, 513 (2005) all hereby incorporated by reference.

Referring to FIG. 1, a widely used approach for generating quantum-entangled light beams employs a frequency-converting optical material 10, such as a crystal with a quadratic nonlinearity, that may be pumped with photons 12 at a first frequency of $2\omega$ to generate, in a "down-conversion" process, a pair of photons 14 and 14' for each photon 12. The photons 14 and 14' each have half the frequency of photon 12, that is, a frequency of $\omega$. Importantly the two photons 14 and 14', created from each photon 12, are quantum-entangled 16.

Higher frequency quantum-entangled light with shorter wavelengths, can be particularly important for applications involving measurements, imaging (including lithography) and communications, yet this down-conversion process may be disadvantageous when high frequency quantum-entangled light beams are desired. The input photons 12 of the light used for pumping the optical material 10 must, in the down-converting system, have twice the frequency of the light to be produced. Such high frequency input light may be difficult or inefficient to generate and may not provide good conversion efficiencies with common down-converting optical materials 10.

Referring to FIG. 2, an up-conversion process is also known where two photons 20 and 20' of frequency $\omega$ are received by the optical material 10 to generate a single photon 24 of twice the frequency, that is, $2\omega$. Referring to FIG. 3, two up-converted beams of photons 24, for example, from lasers 26 and 26' may be quantum-entangled by directing them to opposite sides of a beam splitter 36. Specifically, separate optical material 10 and 10' for each laser 26 and 26' may receive a pumping beam of photons 20 and 20' derived from a single source 30 split by beam splitter 32 and then directed to the optical material 10 and 10' respectively, by diverting mirrors 22 and 22'. As before, each beam of photons may have a frequency of $\omega$ and may be up-converted within the optical material 10 and 10' to produce output beams of photons 24 and 24' of frequency $2\omega$. These separate beams of photons 24 and 24' are directed (with a precise relative phase) obliquely at opposite sides of a beam splitter 36 to generate a quantum-entanglement 16 between reflected and transmitted beams 38 and 38'.

Unlike the down-conversion process, this up-conversion process is relatively complex involving multiple optical cavities, beam splitters, combining mirrors, and optical paths that must be carefully controlled. The up-conversion process also produces output beams that have highly-squeezed states that may not be ideal for many applications. A squeezed state is one in which the product of the variance of the amplitude and phase quadratures of the light are equal to or greater than the quantum mechanical limit set by the Heisenberg uncertainty principle, yet either the amplitude or the phase quadrature has a variance which is less than the square root of this Heisenberg limit.

BRIEF SUMMARY OF THE INVENTION

The present inventors have determined that the field of the pumping energy source, for example, a common pumping light source, can produce quantum-entanglement in up-converted photons. This allows the production of up-converted, quantum-entangled light beams from a single optical cavity, greatly simplifying the optical circuit and thus the robustness of the device. In addition the quantum-entangled light beams produced have less squeezing than is produced with the above described system using the beam-splitter for entanglement of the beams. The beams may also have non-classical intensity correlation. Both quantum entanglement and intensity correlation are examples of non-classical statistics.

Specifically then, the present invention provides an apparatus for producing at least two light beams with non-classical statistics. The invention uses a first pumping light source having a first frequency and an optical cavity providing an up-converting material and a first and second separate output port. The up-converting material receives the first pumping light source to generate a first and second light beam with quantum-entanglement, the first light beam exiting the first output port and the second light beam exiting the second output port where the first and second light beams have a second frequency greater than the first frequency.

It is thus one feature of at least one embodiment of the invention to provide a simple source of quantum-entangled or non-classical intensity correlated light beams potentially employing a single cavity.

The first and second output ports of the optical cavity may be a first and second inwardly directed reflector reflecting light along an axis passing through the up-converting material.

It is therefore one feature of at least one embodiment of the invention to provide a simple means of extracting two beams with non-classical statistics from a single cavity by using standard cavity mirrors.

Alternatively, the optical cavity may provide a reflector ring directing light in a ring passing at least in part through the up-converting material.

It is thus another feature of at least one embodiment of the invention to provide an alternative ring topology for producing quantum-entangled or non-classical intensity correlated beams.

The up-converting material may be a crystal providing nonlinear light transformation.

It is thus another feature of at least one embodiment of the invention to provide a simple solid-state up-converting material.

The second frequency may be less than 500 nm in wavelength at powers of greater than 1 milliwatt with frequencies below 220 nm predicted to be possible at these power levels using standard techniques of second harmonic generation.

It is thus a feature of at least one embodiment of the invention to provide high frequency quantum-entangled or non-classical intensity correlated beams.

The first and second light beams may have a power of greater than 5 mW.

It is thus a feature of at least one embodiment of the invention to provide for high-powered quantum-entangled beams providing improved application to lithography communication and measurement.

The first and second beams may exit the ports along opposite parallel axes. In one embodiment, the parallel axes are coincident.

It is thus a feature of at least one embodiment of the invention to produce beams that allow for a simple optical geometry in associated equipment.

The pumping light source and the first and second light beams may have amplitude-phase squeezing less than that provided by beams entangled using a beam splitter.

It is thus another feature of at least one embodiment of the invention to provide quantum-entangled beams with reduced squeezing.

These particular features and advantages may apply to only some embodiments falling within the claims and thus do not define the scope of the invention.

DETAILED DESCRIPTION OF THE INVENTION

Figure 1:
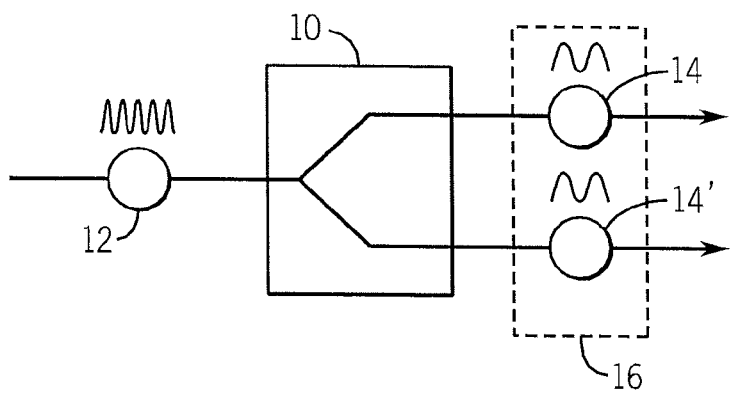
FIG. 1 is a simplified diagram of a prior art down-conversion process showing high-frequency photons down-converted to entangled low frequency photons.
Figure 2:
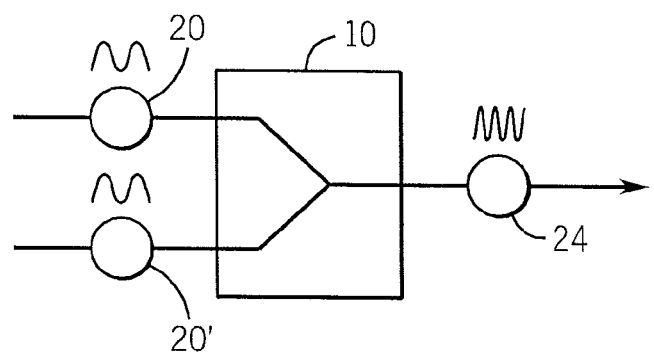
FIG. 2 is a figure similar to FIG. 1 showing a prior up-conversion process where two low frequency photons produce a single high frequency photon.
Figure 3:
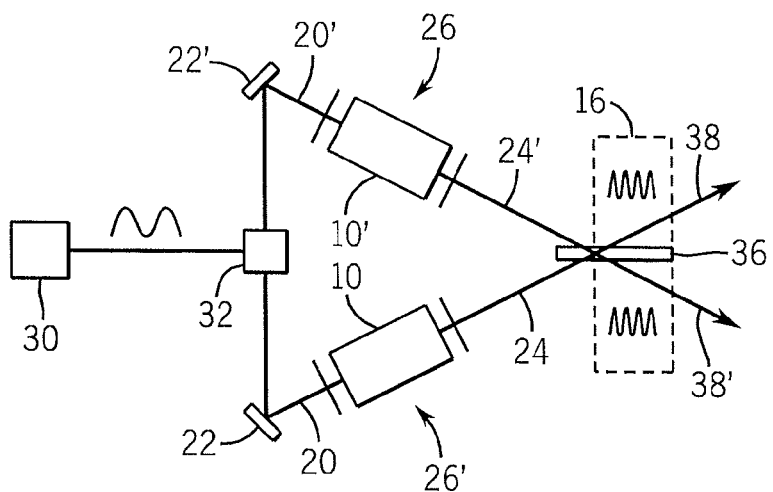
FIG. 3 is a schematic representation of a prior art system for entangling two up-converted photon beams using a beam splitter.
Figure 4:
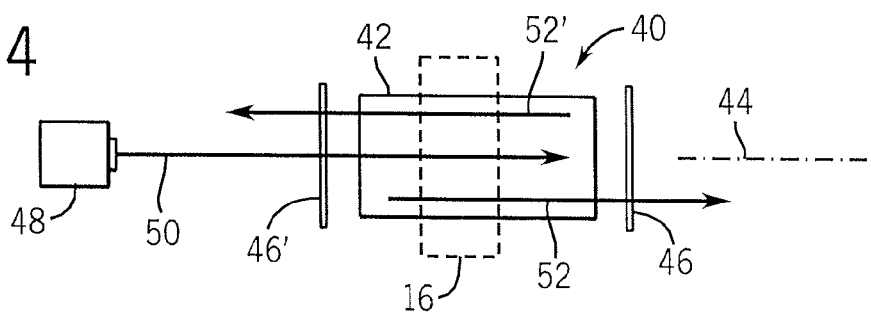
FIG. 4 is a figure similar to that of FIG. 3 showing a linear cavity embodiment of the present invention producing counter directed and entangled photon beams.

Referring now to FIG. 4, the present invention provides an optical cavity 40 holding an up-converting material 42 extending along an axis 44. Two partial mirrors 46 and 46' flank the up-converting material 42, reflecting inwardly and perpendicular to axis 44 to define the optical cavity 40 with a resonant mode at frequency $\omega$.

An optical pumping energy source 48 (such as a laser) may produce a pumping light beam 50 having a frequency of $\omega$. The pumping light beam 50 is introduced into the up-converting material 42 (for example, through one partial mirror 46 or 46') which provides a lasing medium to produce up-converted, entangled beams 52 and 52' of frequency $2\omega$ per a conventional up-converting laser system. Beam 52 may exit through partial mirror 46 along axis 44 in a first direction and beam 52' may exit in the opposite direction along axis 44 through mirror 46'.

The present inventors have determined that the common field produced by the pumping light beam 50 establishes quantum-entanglement 16 between the beams 52 and 52'. In this way two spatially separate quantum-entangled beams 52 and 52' having a frequency of $2\omega$, greater than the frequency $\omega$ of the pumping energy source 48, may be created without separate lasers or external optics for creating entanglement. In addition, the beams 52 and 52' have non-classical intensity correlation.

Figure 5:
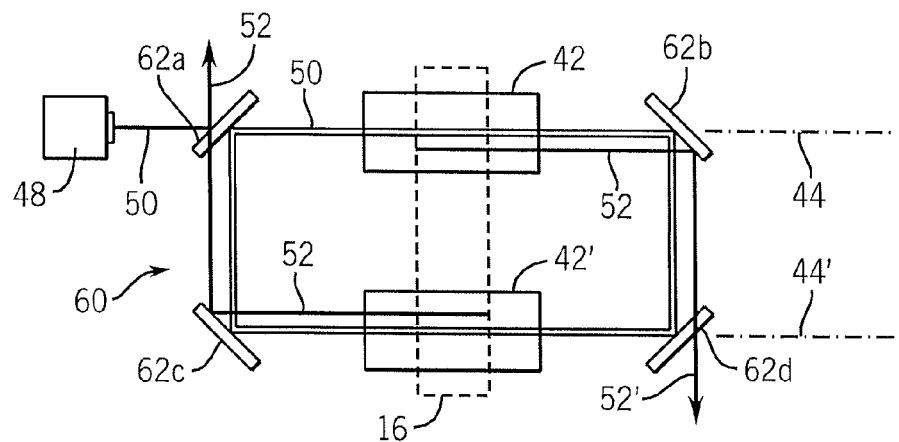
FIG. 5 is a figure similar to that of FIG. 4 showing an alternative embodiment using a ring cavity.

Referring now to FIG. 5, in an alternative embodiment a ring cavity 60 may be used having a set of ring mirrors 62 positioned at the vertices of a rectangle and creating a resonant cavity in which light circulates in a ring.

For example, two mirrors 62a and 62b may be positioned in opposition along axis 44 and tipped at 45° to that axis 44 to reflect the light passing between the mirrors 62a and 62b perpendicularly downward. The downward directed light from mirror 62a may be received by a mirror 62c and directed perpendicularly toward a fourth mirror 62d along a second axis 44' spaced from and a parallel to axis 44. Likewise the downward directed light from mirror 62b may be received by mirror 62d and directed perpendicularly toward mirror 62c along axis 44 to close the ring.

Mirrors 62a and 62d may be partial mirrors allowing pumping light beam 50 to enter the ring along axis 44 through mirror 62a and a first quantum-entangled beam 52 passing in a clockwise direction around the ring cavity 60 to exit vertically and perpendicular to axis 44 through mirror 62a. Likewise a second quantum-entangled beam 52' passing counter-clockwise around the ring cavity 60 may exit downward through mirror 62b perpendicular to axis 44'. As before, the beams 52 and 52' also have non-classical intensity correlation.

One or more up-converting materials 42 and 42' may be placed in the path of light within the ring cavity 60. The common pumping field of pumping light beam 50 passing around the ring cavity 60 provides a quantum-entanglement 16 of light generated by both materials 42 and 42' even though they may be separate.

EXAMPLE 1

Figure 6:
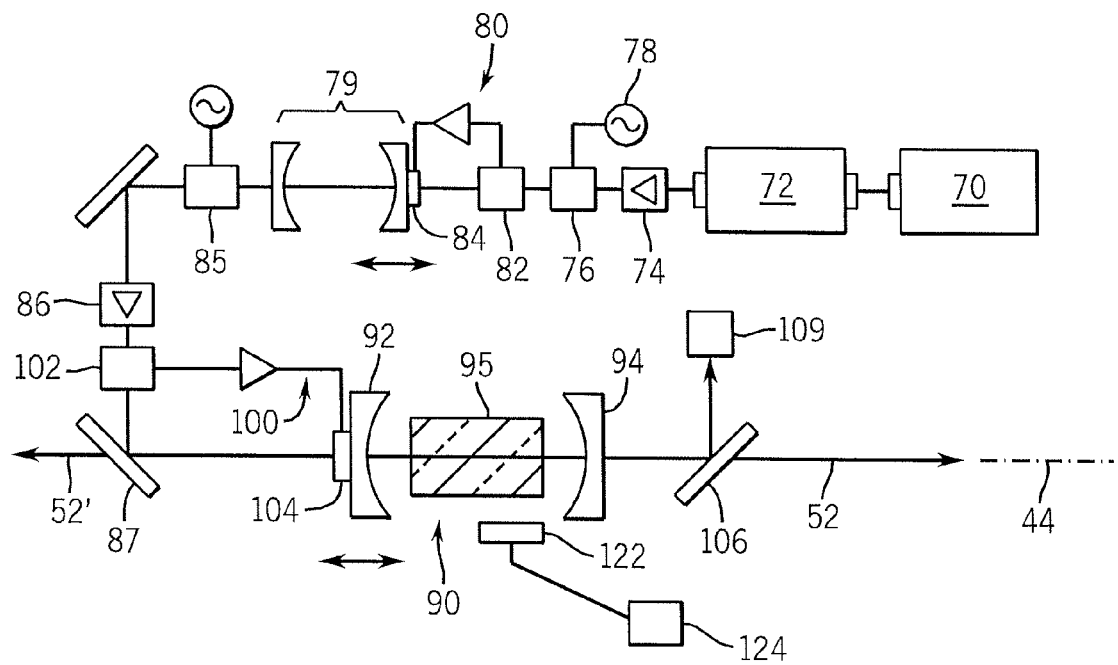
FIG. 6 is a detailed block diagram of an experimental implementation of the design of FIG. 4.

Referring now to FIG. 6, an implementation of the present invention may use a near infrared laser 70, for example, being an argon-ion laser to pump a Ti:Sa laser 72 operating at 857 nm.

The beam from the laser 72 may pass through a Faraday isolator 74 (allowing light to pass out of laser 72 but not back) and then to an electro-optic modulator 76 that may amplitude modulate the light beam with a first modulation signal 78.

The modulated beam may then pass into a mode cleaning cavity 79 formed from two opposed plano-concave partial mirrors precisely separated to provide a resonant cavity with a pass band line width of 1.5 MHz (FWHM) centered at 857 nm. A servo loop 80 including a photodetector 82 and an axial piezoelectric mirror actuator 84, of a type well known in the art, dynamically tunes the separation of the plano-concave mirrors of the cavity 79, to remain centered on the frequency of laser 72. This is done by monitoring the phase of the beat signal between the side bands generated by the electro-optic modulator 76 and the beam from laser 72 according to techniques well known in the art and using an electronic control circuit to maintain the phase at a correct value according to techniques well known in the art.

The "clean" narrowband signal exiting from the cavity 79 is received by a second photo modulator 85 and passed through a second Faraday isolator 86 to be directed by a first dichroic mirror 87 into an up-converting cavity 90.

The cavity 90 consists of two plano-concave partial mirrors 92 and 94 with the radius of curvature of 10 mm containing a 1 cm long a-cut $KNbO_3$ crystal with anti-reflection coated ends serving as the up-converting material 95. The separation of the mirrors 92 and 94 may be controlled by a feedback loop 100 similar to servo loop 80 that monitors the modulated input wave, as modulated by modulator 85, reflected from the up-converting cavity 90 using photodetector 102 to control a piezoelectric actuator 104 making precise axial adjustments of one of mirrors 92 again to center the mode of the cavity 90 at the wavelength of 857 nm from laser 72. The separation of the mirrors 92 and 94 were set to 15.6 mm for confocal operation and the low-power cavity finesse was measured to be 120. Round-trip cavity loss was calculated to be about 1.1%.

The pumping light from the laser 72 is diverted into the cavity 90 through a dichroic mirror 87 positioned at 45° with respect to the optical axis 44 of the cavity 90. The dichroic mirror 87 has a transmission at 857 nm of 4% and a reflection at 428 nm (twice the frequency of the laser 72) of less than 5%. In this way, the dichroic mirror 87 may divert light from laser 72 in a cavity 90 but allow up-converted beams 52' out a cavity 90 from the left side of the cavity 90 through dichroic mirror 87.

A separate second dichroic mirror 106 may be positioned on the opposite side of the cavity 90 at 45° to axis 44 to divert any low-frequency light from laser 72 passing through cavity 90 into an optical sump 109 while allowing a second up-converted beam 52 to exit along axis 44. The second dichroic mirror 106 may provide a reflectance at 857 nm of greater than 99% and a reflectance at 428 nm of less than 5%.

Phase matching to ensure the proper conditions for up-conversion at 857 nm was controlled by changing the temperature of the crystal by means of a heater 122 operated by a feedback thermostat control 124. A crystal temperature of about 16.8° C. equalized the output power between the beams 52 and 52'. With a pump power from laser 72 of about 34 mW, 8 mW of energy at 428.5 nm was generated in each output beam 52 and 52'.

The maximum non-classical intensity correlation (corrected for electronic noise) was −0.90±0.15 dB at a noise frequency of 6 MHz. At 5 MHz, the sum variance was (0.50±0.15) dB below the shot noise level and the normalized variance was $(\Delta |i_+|)^2 = 1.78 \pm 0.07$. The difference variance was (0.10±0.15) dB below the shot noise level giving a normalized noise variance (phase correlation) of $(\Delta |i_-|)^2 = 1.95 \pm 0.07$. Expressed in dB, the entanglement signature (normalized variance minus normalized noise variance) was $10 \log_{10}(3.73/4)$ equals −0.3 dB.

It is believed that this method can create high power entanglement (>1 milliwatt) down to 220 nm using standard techniques of second harmonic generation.

The quantum-entangled beams of the present invention may be used in a variety of applications including those described in U.S. Pat. No. 5,796,477 entitled: Entangled-Photon Microscopy, Spectroscopy, and Display; U.S. Pat. No. 6,567,164 entitled: Entangled-Photon Microscope and Confocal Microscope; U.S. Pat. No. 6,583,881 entitled: Lithography Using Quantum Entangled Particles; and U.S. Pat. No. 6,822,739 entitled: Entangled-Photon Ellipsometry, hereby incorporated by reference.

The present invention has been described in terms of the preferred embodiment, and it is recognized that equivalents, alternatives, and modifications, aside from those expressly stated, are possible and within the scope of the appending claims.

What is claimed is:

1. An apparatus for producing at least two light beams with non-classical light statistics comprising:
    a first pumping light source having a first frequency;
    an optical cavity including an up-converting material receiving the first pumping light source and providing a first and second separate output port, the up-converting material, in response to the first pumping light source, producing a first and second light beam with quantum-entanglement, the first light beam exiting the first output port and the second light beam exiting the second output port;
    wherein the first and second light beams have a second frequency greater than the first frequency.

2. The apparatus of claim 1 wherein the optical cavity provides a first and second inwardly directed reflector, the first and second inwardly directed reflectors reflecting light along an axis passing through the up-converting material, wherein the first and second inwardly directed reflectors provide the first and second output ports.

3. The apparatus of claim 1 wherein the optical cavity provides a reflector ring directing light in a ring passing at least in part through the up-converting material.

4. The apparatus of claim 1 wherein the up-converting material is a crystal providing nonlinear light transformation.

5. The apparatus of claim 1 wherein the second frequency is less than 500 nm in wavelength with a power of greater than 1 milliwatt.

6. The apparatus of claim 1 wherein the first and second light beams are quantum entangled.

7. The apparatus of claim 1 wherein the first and second light beams are intensity correlated.

8. The apparatus of claim 1 wherein the first and second beams exit the output ports along opposite parallel axes.

9. The apparatus of claim 8 wherein the parallel axes are coincident.

10. The apparatus of claim 1 including at least one apparatus receiving the first and second beams and consisting of the group including: a quantum-enhanced measurement system; a quantum-enhanced photolithography system; and a quantum-enhanced communication system.

11. A method for producing at least two light beams with non-classical light statistics comprising the steps of:
    generating a first pumping light source having a first frequency;
    introducing the first pumping light source into an optical cavity including an up-converting material receiving the first pumping light source, a first and second light beam with quantum-entanglement derived from generation of the first and second light beams in a common field of the pumping light source, the first and second light beams having a second frequency greater than the first frequency;
    extracting the first light beam from the optical cavity through a first output port and the second light beam exiting through a separate second output port.

12. The method of claim 11 wherein the optical cavity provides a first and second inwardly directed reflector, the first and second inwardly directed reflectors reflecting light along an axis passing though the up-converting material, wherein the first and second inwardly directed reflectors provide the first and second output ports.

13. The method of claim 11 wherein the optical cavity provides a reflector ring directing light in a ring passing at least in part through the up-converting material.

14. The method of claim 11 wherein the up-converting material is a crystal providing nonlinear light transformation.

15. The method of claim 11 wherein the second frequency is less than 500 nm in wavelength with a power of greater than 1 milliwatt.

16. The method of claim 11 wherein the first and second beams exit the output ports along opposite parallel axes.

17. The method of claim 16 wherein the parallel axes are coincident.

18. The method of claim 11 including the step of using the first and second beams for at least one of quantum-enhanced measurement, a quantum-enhanced photolithography, and a quantum-enhanced communication.

* * * * *